(12) United States Patent
Lorenzini et al.

(10) Patent No.: US 9,129,537 B1
(45) Date of Patent: Sep. 8, 2015

(54) DISPLAY BOARD FOR MULTIMEDIA DEVICES

(71) Applicants: Ann Louise Lorenzini, Chazy, NY (US); Bowen Lorenzini Christopher, Chazy, NY (US)

(72) Inventors: Ann Louise Lorenzini, Chazy, NY (US); Bowen Lorenzini Christopher, Chazy, NY (US)

( * ) Notice: Subject to any disclaimer, the term of this patent is extended or adjusted under 35 U.S.C. 154(b) by 0 days.

(21) Appl. No.: 14/624,691

(22) Filed: Feb. 18, 2015

Related U.S. Application Data

(60) Provisional application No. 62/040,525, filed on Aug. 22, 2014.

(51) Int. Cl.
| | |
|---|---|
| *G09F 1/00* | (2006.01) |
| *G09F 1/08* | (2006.01) |
| *G09F 15/00* | (2006.01) |
| *G09F 15/02* | (2006.01) |
| *G09B 25/00* | (2006.01) |
| *G09B 29/00* | (2006.01) |
| *A47B 97/04* | (2006.01) |
| *G06F 1/16* | (2006.01) |
| *G09F 1/06* | (2006.01) |

(52) U.S. Cl.
CPC ............... *G09F 1/06* (2013.01); *G06F 1/1605* (2013.01); *G09F 15/0068* (2013.01)

(58) Field of Classification Search
CPC ...... G06F 1/1605; G09F 1/06; G09F 15/0068
USPC ............... 361/679.01, 679.21, 679.26, 679.3, 361/679.41, 679.42, 679.43, 679.44; 248/676, 458, 459, 460, 461, 917, 918, 248/919, 920, 921, 922, 923, 924; 40/661.08, 606.16, 606.18, 124.12, 40/538, 539, 540; 434/430, 365, 428, 429

See application file for complete search history.

(56) References Cited

U.S. PATENT DOCUMENTS

| | | | | |
|---|---|---|---|---|
| 1,655,539 | A * | 1/1928 | Freedman | 248/459 |
| 2,559,489 | A * | 7/1951 | Wolf | 40/539 |
| 2,867,045 | A * | 1/1959 | Millgate | 434/426 |
| 3,191,327 | A * | 6/1965 | Neff | 40/124.17 |
| 4,045,897 | A | 9/1977 | Gates | |
| 4,436,135 | A | 3/1984 | Ytter | |
| 4,711,046 | A | 12/1987 | Herrgord | |
| 4,926,609 | A | 5/1990 | Arico | |
| 5,607,135 | A * | 3/1997 | Yamada | 248/456 |
| 5,658,635 | A | 8/1997 | Davis et al. | |
| 5,988,582 | A | 11/1999 | Olivo | |
| 6,382,581 | B1 * | 5/2002 | Duff | 248/459 |
| 6,412,744 | B1 | 7/2002 | Wollam et al. | |
| 6,484,429 | B1 * | 11/2002 | Przylucki | 40/661.08 |
| 6,615,551 | B2 | 9/2003 | Chesser et al. | |
| 6,682,041 | B1 * | 1/2004 | Branham, II | 248/441.1 |
| 6,767,215 | B2 * | 7/2004 | Robertson | 434/432 |
| 6,772,816 | B2 | 8/2004 | Carter et al. | |
| 6,779,286 | B2 * | 8/2004 | Shaffer et al. | 40/606.16 |
| 7,040,899 | B2 * | 5/2006 | Armstrong | 434/430 |

(Continued)

OTHER PUBLICATIONS

USD691653 Oct. 15, 2013 Benadon Book (The above form will not accept this number).

*Primary Examiner* — Anthony Haughton

(57) ABSTRACT

Display boards of the kind generally used for presentations in educational and business settings, for example, and that can be made from a variety of materials including foam board and rigid paper pulp, are provided that include an opening for a screen of a multimedia device, a holder for the multimedia device, and a support for stabilizing the display board.

18 Claims, 6 Drawing Sheets

(56) References Cited

U.S. PATENT DOCUMENTS

| | | | |
|---|---|---|---|
| 7,225,573 B2* | 6/2007 | Shaffer | 40/661.08 |
| 7,451,800 B2 | 11/2008 | Johnson | |
| 7,818,904 B2* | 10/2010 | Wagner | 40/124.18 |
| 7,828,260 B2* | 11/2010 | Hauser et al. | 248/456 |
| 8,047,851 B1 | 11/2011 | Baxter | |
| 8,724,312 B2* | 5/2014 | Jones et al. | 361/679.44 |
| 2005/0121594 A1* | 6/2005 | Kuo | 248/676 |
| 2009/0053685 A1 | 2/2009 | Common | |
| 2011/0239505 A1 | 10/2011 | Fink | |
| 2011/0319162 A1 | 12/2011 | Corcoran | |
| 2012/0057295 A1 | 3/2012 | Simpson et al. | |
| 2013/0025174 A9 | 1/2013 | Sapp | |
| 2013/0036635 A1 | 2/2013 | Mayer et al. | |

* cited by examiner

DISPLAY BOARD FOR MULTIMEDIA DEVICES

CROSS-REFERENCE TO RELATED APPLICATIONS

This application claims the benefit of Provisional Application for Patent Ser. No. 62/040,525 filed on Aug. 22, 2014.

STATEMENT REGARDING FEDERALLY SPONSORED RESEARCH OR DEVELOPMENT

Not applicable.

FIELD OF THE INVENTION

This invention relates to display boards for presentations, in particular display boards to which multimedia devices are attached.

BACKGROUND OF THE INVENTION

Display boards are manufactured in a variety of shapes and styles, the most popular being tri-fold display boards made of rigid paper pulp and/or foam material that is divided into folding panels. Display boards are used for the public display of static information that is adhered to the front surface of the display board. Typically display boards are placed on tables and are used for non-permanent presentations or exhibitions, often in educational or business settings.

In these contexts, the display boards are often accompanied by multimedia devices, such as tablets, e-readers and laptop computers, that can display related and/or interactive content. When used in this manner, a multimedia device typically rests separately on a table near the base of the display board, which is often not at eye level for potential viewers. Therefore, it would be desirable to be able to affix multimedia devices to display boards to unify the display of both digital and static information. However, current techniques, such as simply gluing a multimedia device to standard display boards, may be less aesthetically pleasing, make the board unstable, make the multimedia device difficult to connect to accessory devices and can potentially damage the multimedia device.

Therefore, what is needed is a display board designed for integrating a multimedia device.

SUMMARY OF THE INVENTION

The present invention provides a display board with an opening for a multimedia device on the display board, a receptacle for securing the device to the board, and a support for stabilizing the board. In addition, ports may be included in the display board for cords for device accessories.

DETAILED DESCRIPTION OF PREFERRED EMBODIMENTS

Display boards for use in non-permanent presentations and exhibitions are typically constructed of foam board or paper pulp, including cardboard, and can have veneers of paper, plastic, cork, fabric, wood, carbon fiber, chalkboard surfaces or a material to which magnets can attach. A common example is a trifold board in which the display board has three panels connected by a hinge or fold so that the board can both be folded up for easier transport and storage and be stood up on a table or other surface while being displayed.

Figure 1:
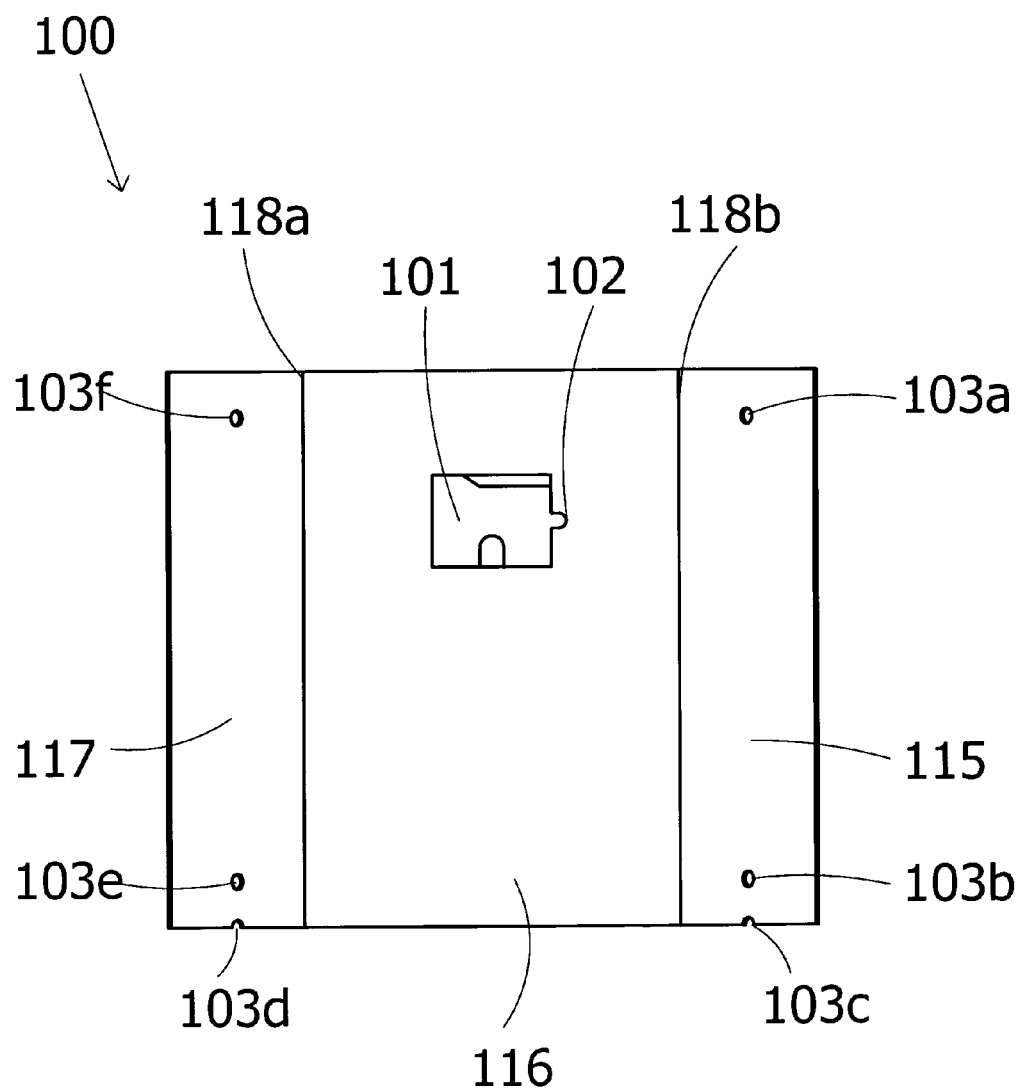
FIG. 1 is a front view of a display board of the present invention.
Figure 5:
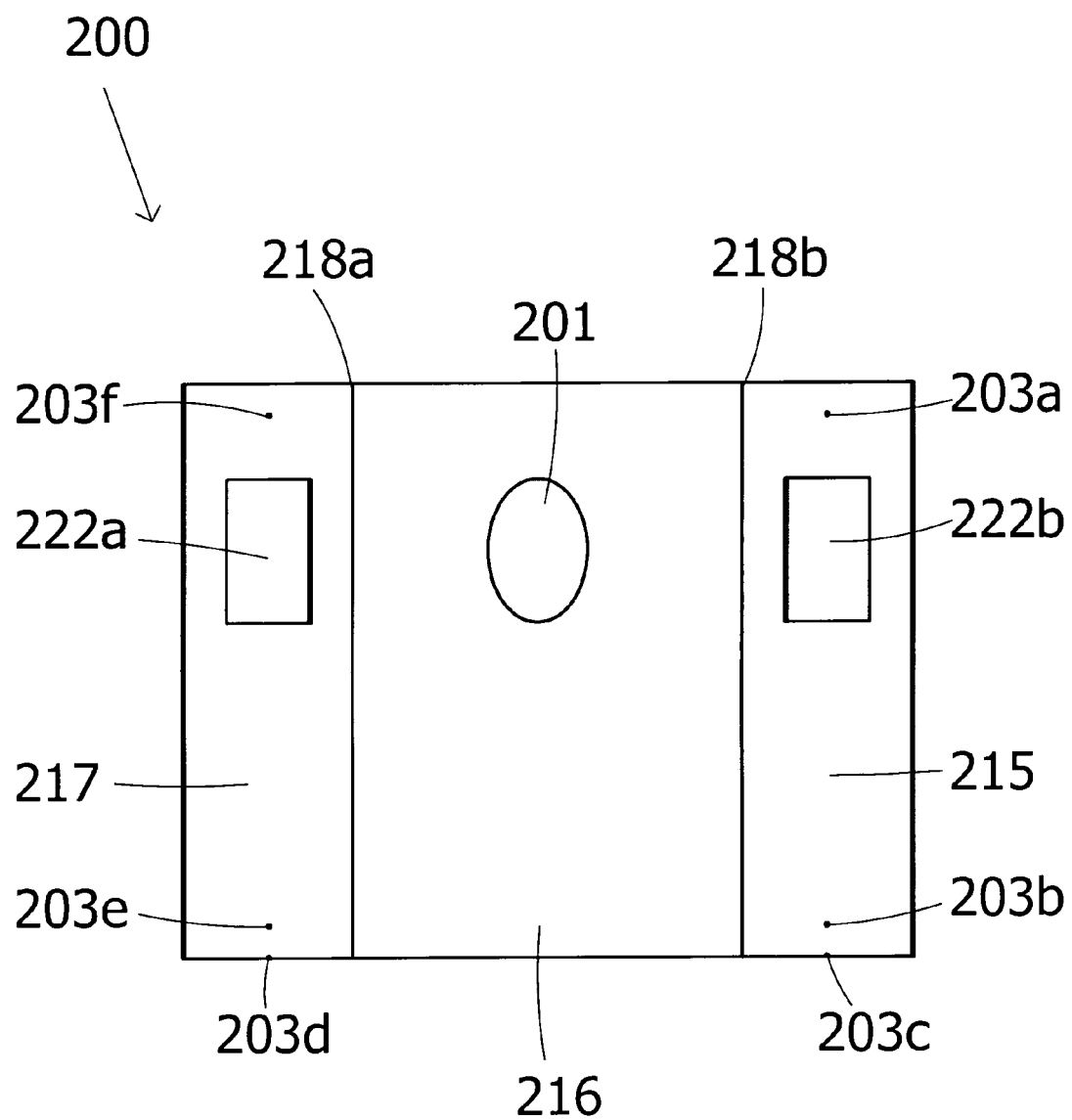
FIG. 5 is a front view of a display board of another embodiment of the present invention.

FIG. 1 shows an improved tri-fold display board 100 of such type with a left panel 117, center panel 116 and right panel 115, that includes an opening 101 through which a screen or monitor of a multimedia device may be shown. Display board 100 is shown with one opening 101 but it will be understood that display boards of the present invention may have more than one opening for attaching more than one multimedia device, as shown for example in FIG. 5. Opening 101 is depicted as generally rectangular in shape but can be any shape depending on the intended use and type of multimedia device, including for example round, oval, square, or slotted.

Opening 101 may be sized for a variety of kinds of multimedia devices, including tablets and e-readers, for example. Opening 101 may include a contoured access carve out 102 for allowing access to operational control buttons on a multimedia device while the device is attached to the display board 100. Display board 100 may also include ports (103a-103f) to allow wires and cables to connect to the multimedia device while it is attached to the display board 100. For example, a keyboard or mouse may be connected to the multimedia device and cords may run from the multimedia device to the accessories by passing through the ports (103a-103f) as necessary. In addition, power or Ethernet cables may be passed through ports (103a-103f).

Figure 2:
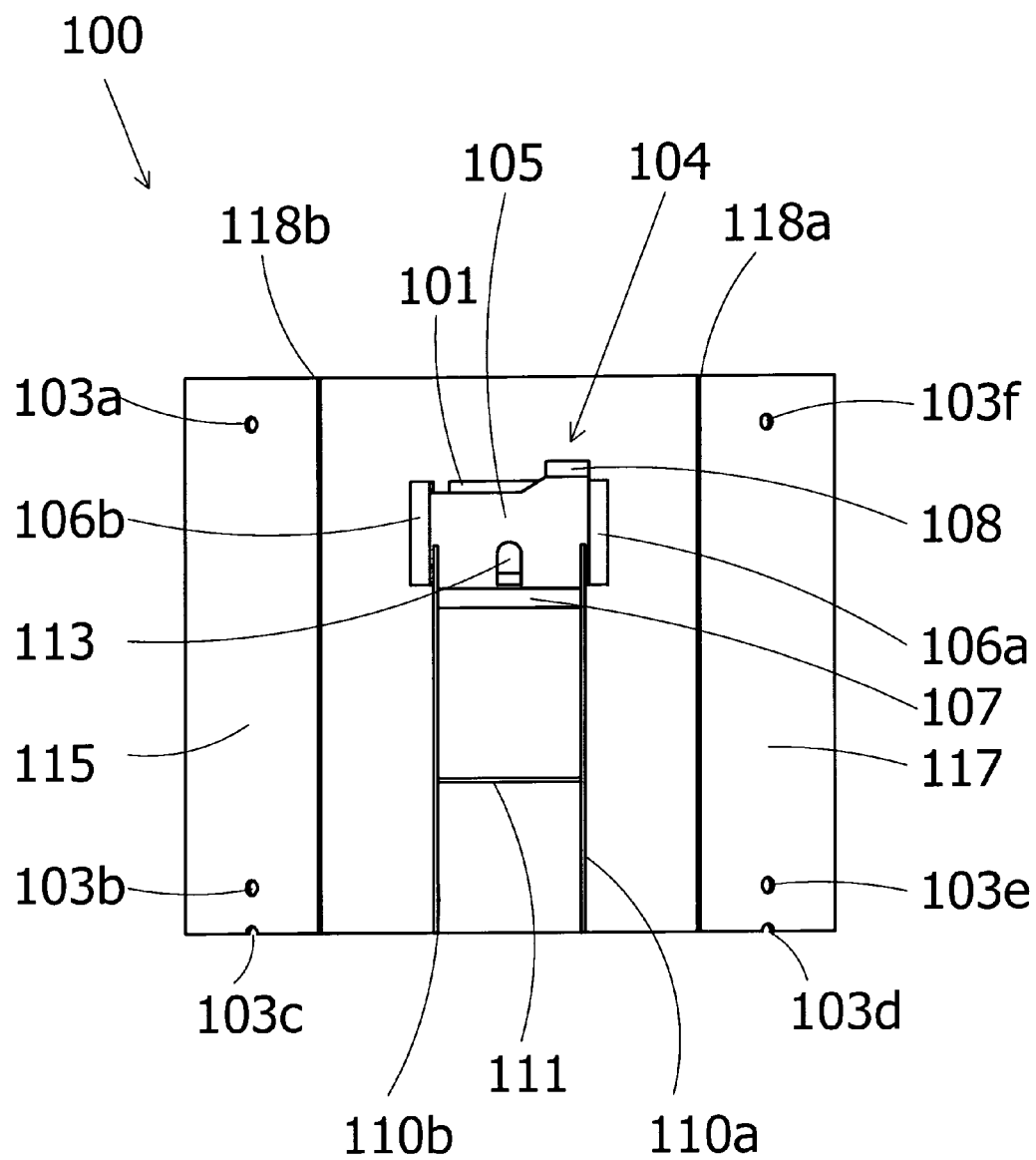
FIG. 2 is a rear view of a display board of the present invention.
Figure 3:
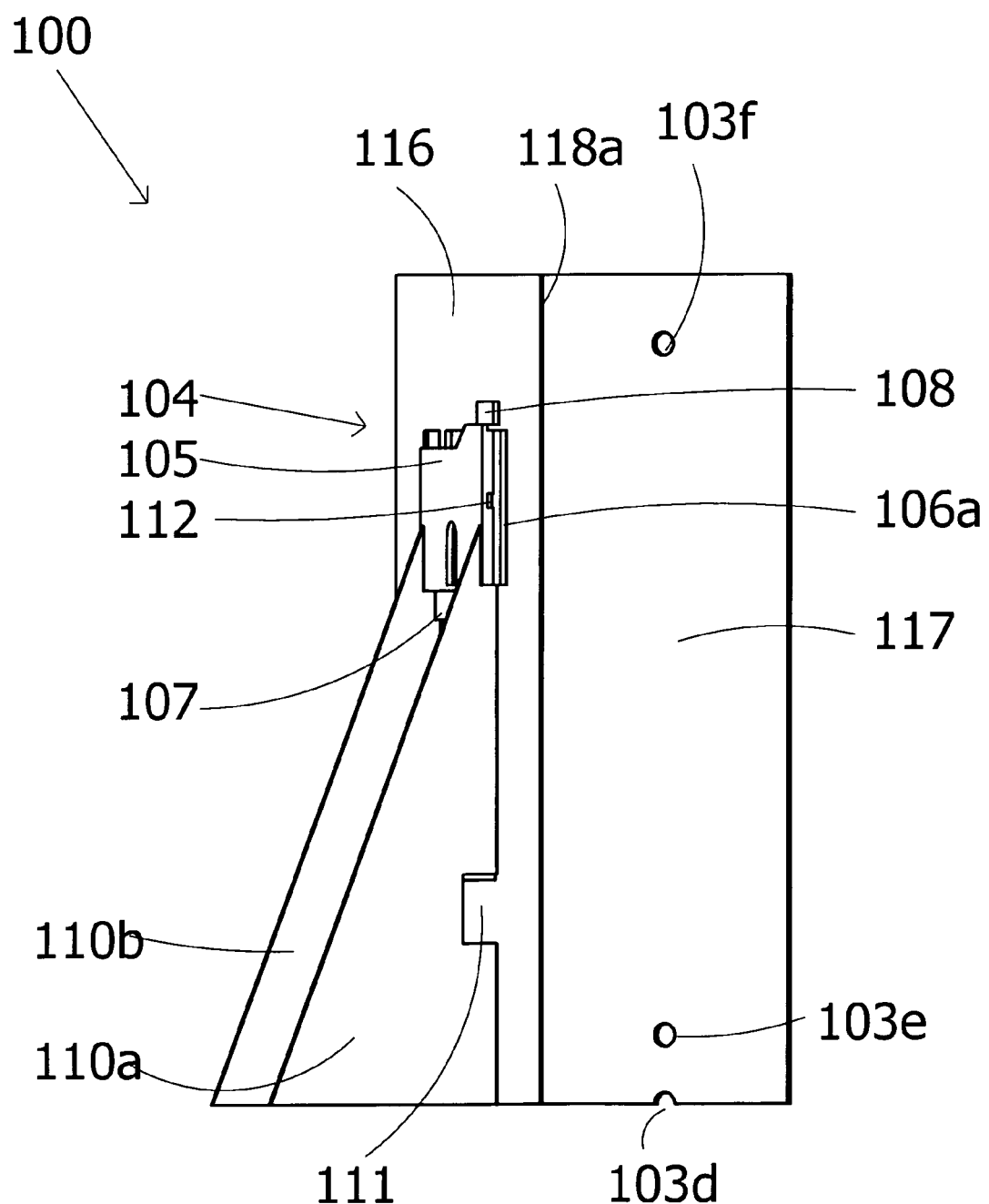
FIG. 3 is a side view of a display board of the present invention.
Figure 4:
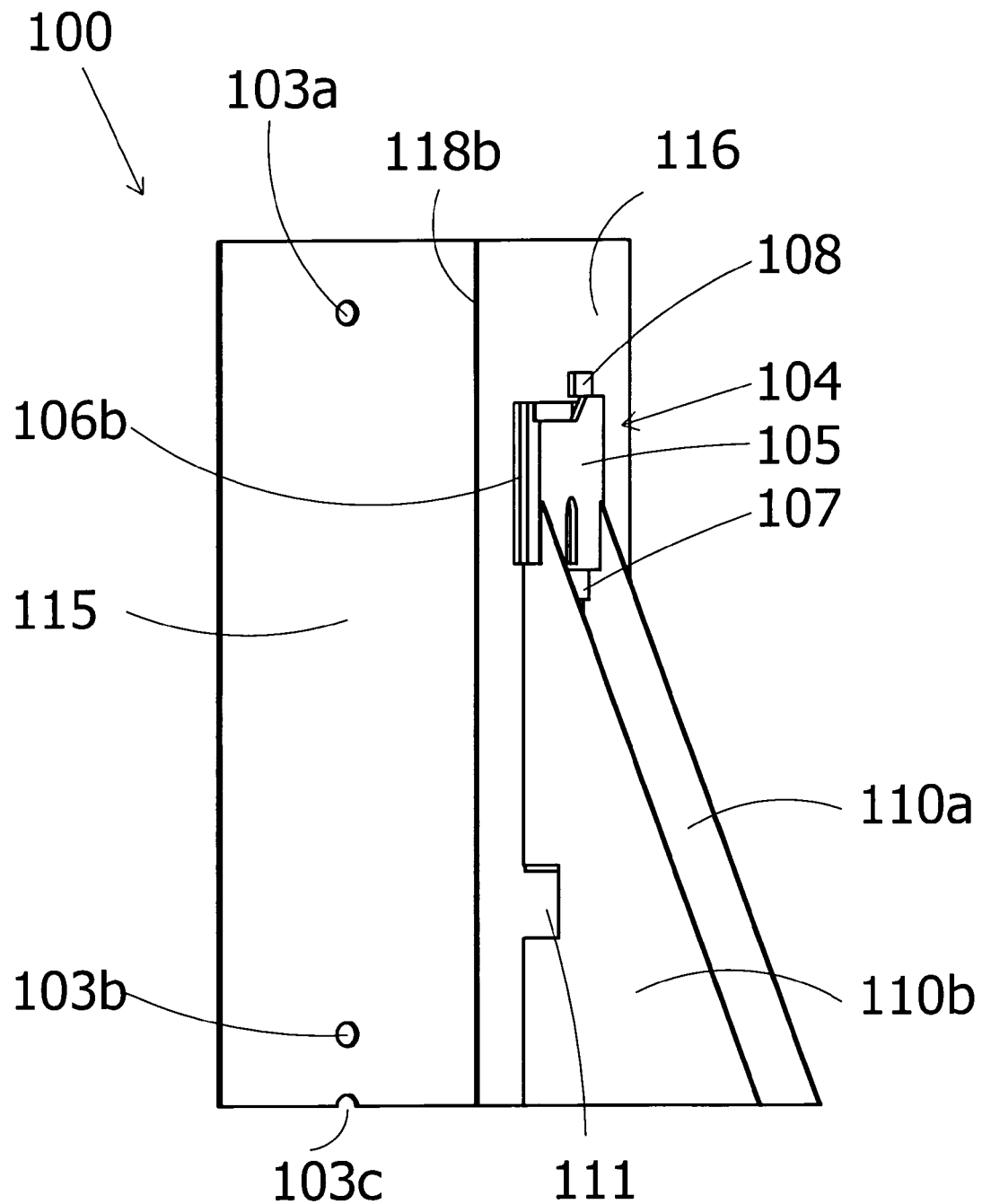
FIG. 4 is another side view of a display board of the present invention.

A multimedia device may be attached to display board 100 near the opening 101 via a holder 104 (shown in FIGS. 2-4). In a preferred embodiment, holder 104 may be located on a rear side of the display board 100, as shown. Holder 104 may be located such that a screen of a multimedia device will be visible through opening 101 when the device is in the holder 104 and sized to receive multimedia devices. Holder 104 may be adjustable in size in order to accommodate a variety of multimedia devices. Holder 104 may be made of any suitable material, including the material the display board 100 is made of and plastic. Holder 104 may include a rear portion 105, side portions 106a and 106b, a bottom portion 107 and top portion 108. The portions of holder 104 may be mesh, solid, or frames and can be attached to display board 100 by any suitable mechanism, including adhesives, threaded pins, rivets, hook and loop, or via hinges or folds. Holder 104 may include holes, such as hole 113 as shown in FIG. 2, to facilitate placement and removal of a multimedia device as well as to allow for cooling and ventilation. Further, holder 104 may include a power cord opening 112, as shown in FIG. 3.

Figure 6:
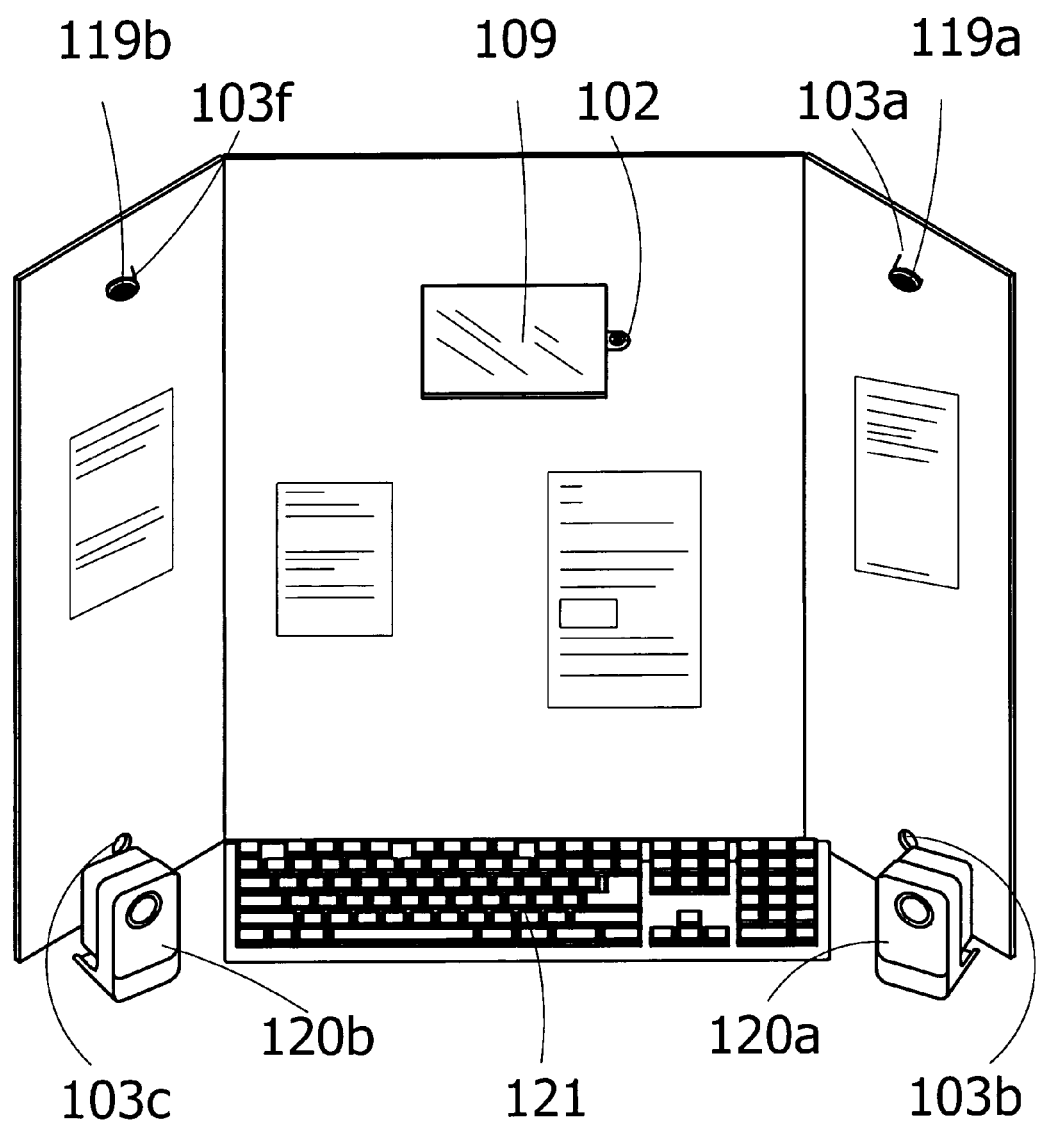
FIG. 6 is a front view of the display board of FIG. 1 with a multimedia device included and accessories connected to the multimedia device and static displays attached to the display board.

In operation, as shown in FIG. 6 (in conjunction with FIG. 2), a multimedia device 109 can be attached to the display board 100 by placing the multimedia device 109 into the holder 104. Once in place, device 109 can be secured by attaching top portion 108 of holder 104 to the rear face of the display board 100 and/or to the side portions 106 and/or the rear portion 105 using any suitable attachment mechanism, preferably a detachable mechanism such as hook and loop, screw type, slot, or eye and hook. In addition, a locking mechanism can be used to prevent unwanted or accidental removal of device 109 from the display board 100. Also shown in FIG. 6, accessories may be conveniently connected to device 109 through the display board 100 via accessory ports. For example, accessory ports 103b, 103c, 103e or 103d can be used for connecting speakers 120a and 102b as well as keyboard 121. Lighting accessories (119a and 119b) may also be connected, via accessory ports, such as ports 103a and 103f as shown. Additionally, other accessories such as a mouse, printer or other multimedia devices may be connected to the attached multimedia device 109 while the display board 100 is in use in an upright position.

To remove multimedia device 109, the top portion 108 may be detached from the display board and/or other portions of holder 104 and the device 109 can be slid out of holder 104.

FIGS. 3 and 4 show a side perspective view of the display board 100 with stabilizers 110a and 110b (also shown in FIG. 2). The stabilizers can serve to support the extra weight of the multimedia device 109 and provide additional stability to the display board 100, which may be top heavy when a multimedia device is inserted in holder 104, depending on the weight of the device and where it is attached to the display board. The stabilizers 110 may be made of any suitable material, including the same material as the display board 100, that is generally rigid. Preferably, the stabilizers 110 will be connected to the display board 100 near holder 104 or by holder 104, as shown in FIG. 3 and FIG. 4. Alternatively, or additionally, the stabilizers 110 may be attached to the display board 100 via stabilizer members 111 or other suitable technique, such as with footers. The stabilizers 110 extend downward to the bottom of display board 100 and extend at the bottom of display board 100 away from the display board 100 a distance sufficient to confer additional stability to prevent the display board from tipping over when a multimedia device 109 is in the holder 104 under typical use conditions. Alternatively, one or more feet stabilizers could extend from the bottom of any part of the display board to confer stability as needed. Preferably, the stabilizers 110 could be removably attached to the display board 100 or would be capable of being folded flat onto the back of display board 100 for ease of transport and storage.

To facilitate storage and transport prior to intended end use, the display board 100 of the present invention may be constructed so that the holder 104 lies relatively flat with respect to the display board 100 until ready for use. In particular, in one embodiment, the top portion 108 of the holder 104 could be formed by folding along score marks or the like for the top portion in a ninety degrees fashion. In a similar manner, the bottom portion of the holder could be formed by folding the bottom portion out along score marks or the like to ninety degrees, while the side portions 106a and 106b of the holder 104 could be similarly formed by folding along score marks or the like on the rear side of display board 100 near the vertical sides of opening 101. Once the portions of the holder 104 were folded out, each portion could be secured together using any suitable mechanism, such as, preferably, adhesives.

The present invention may also include a blank piece of display board or other suitable material (not shown) that can be slipped into or in front of or behind opening 101 to cover or obscure the opening 101 when there is no multimedia device in use or to hide a multimedia device until a later time. In addition, a frame of display board material or other suitable material (not shown) can be placed over, behind or into the opening 101 in order to create cleaner appearances when multimedia devices with smaller screen sizes are to be used in holder 104.

The invention claimed is:

1. A display board comprising:
   a tri-fold poster board with a front face and a rear face and a top and a bottom;
   an opening through the poster board sized to allow at least part of a screen of a multimedia device to be visible through the opening while being smaller along at least one dimension than the multimedia device when the multimedia device is oriented such that the screen of the multimedia device is facing the opening;
   a receptacle attached to the rear face of the poster board such that a screen of a multimedia device can be displayed through the opening when the multimedia device is in the receptacle, wherein the receptacle includes a bottom portion, a rear portion, side portions, and a top portion that can be positioned while the multimedia device is in the receptacle in order to secure the device in the receptacle; and
   a support for stabilizing the poster board, wherein the support is attached to the rear face of the poster board and extends horizontally away from the rear face of the poster board a distance and to a level sufficient to act against the poster boarding tipping over in the direction of the rear face.

2. The display board of claim 1 wherein the opening includes an orifice along a side to allow access to a control of the multimedia device.

3. The display board of claim 2 where in the poster board includes holes for media outlets, power cords and telecommunications cables.

4. The display board of claim 1 wherein the receptacle includes an aperture for a cord.

5. The display board of claim 1 wherein the receptacle includes a gap in the rear portion.

6. The display board of claim 1 wherein the poster board includes paper pulp.

7. The display board of claim 1 wherein the poster board includes polymer material.

8. The display board of claim 1 wherein the poster board includes material that magnets can attach to.

9. The display board of claim 1 wherein the poster board includes wood.

10. The display board of claim 1 wherein the poster board includes fabric.

11. The display board of claim 1 wherein the poster board includes carbon fiber contact paper.

12. The display board of claim 1 wherein the receptacle can be assembled from substantially flat sections attached to the rear face by folding along score marks.

13. A pocket for securing a multimedia device to a display board with an opening in the display board for allowing at least part of a display screen of a multimedia device to show through the opening comprising:
   a bottom of the pocket attached to the board beneath the opening such that the display screen of the multimedia device can show through the opening when the multimedia device rests in at least one orientation on the bottom of the pocket;
   side portions of the pocket attached to the board on either side of the bottom and extending upward from the bottom near vertical edges of the opening;
   a rear of the pocket generally opposite the opening extending upward from the bottom of the pocket; and a top of the pocket that can be positioned to secure the multimedia device in the pocket.

14. The pocket of claim 13 wherein the top is attached to the rear of the pocket through a hinge.

15. The pocket of claim 14 wherein the top is attached to the board through a hinge.

16. The pocket of claim 14 wherein the top is attached to the rear of the pocket by a fold.

17. The pocket of claim 14 wherein the top is attached to the board by a fold.

18. A display board with an opening and a pocket, comprising:
   a bottom of the pocket attached to the board beneath the opening;
   side portions of the pocket attached to the board on either side of the bottom and extending upward from the bottom near the opening;
   a rear of the pocket extending upward from the bottom of the pocket;
   a multimedia device in the pocket whereby at least part of a screen of the multimedia device shows through the opening; and
   a support for stabilizing the display board attached to the display board and extending away from the board in a direction away from the opening.

\* \* \* \* \*